(12) United States Patent
Gottinger et al.

(10) Patent No.: US 11,994,608 B2
(45) Date of Patent: May 28, 2024

(54) METHOD AND DEVICE FOR NON-COHERENT DISTRIBUTED FULL-DUPLEX TRANSMISSION RADAR SYSTEMS

(71) Applicant: Symeo GmbH, Nuebiberg (DE)

(72) Inventors: Michael Gottinger, Buckenhof (DE); Igor Bilous, Neubiberg (DE); Peter Georg Gulden, Erding (DE); Martin Vossiek, Fürth (DE)

(73) Assignee: Symeo GmbH, Nuebiberg (DE)

( * ) Notice: Subject to any disclaimer, the term of this patent is extended or adjusted under 35 U.S.C. 154(b) by 439 days.

(21) Appl. No.: 17/330,094

(22) Filed: May 25, 2021

(65) Prior Publication Data

US 2022/0043105 A1 Feb. 10, 2022

Related U.S. Application Data

(63) Continuation of application No. PCT/EP2019/073857, filed on Sep. 6, 2019.

(30) Foreign Application Priority Data

Nov. 26, 2018 (DE) .................. 102018129795.5

(51) Int. Cl.
*G01S 7/00* (2006.01)
*G01S 7/35* (2006.01)
*G01S 13/82* (2006.01)
*G01S 13/93* (2020.01)
*G01S 13/931* (2020.01)
*G01S 13/933* (2020.01)

(52) U.S. Cl.
CPC ............ *G01S 7/006* (2013.01); *G01S 7/35* (2013.01); *G01S 13/825* (2013.01);
(Continued)

(58) Field of Classification Search
CPC ...... G01S 13/931; G01S 13/87; G01S 13/343; G01S 13/825; G01S 13/933; G01S 2013/9316; G01S 7/003; H04J 3/0635
See application file for complete search history.

(56) References Cited

U.S. PATENT DOCUMENTS

2005/0030935 A1 2/2005 Seisenberger et al.
2018/0180540 A1 3/2018 Gottinger et al.

FOREIGN PATENT DOCUMENTS

CN 201503494 6/2010
CN 201503494 U * 6/2010
(Continued)

OTHER PUBLICATIONS

Scheiblofer et al., *Performance Analysis of Cooperative FMCW Radar Distance Measurement Systems*, Microwave Symposium Digest, 2008 IEEE, 3 pages.
(Continued)

*Primary Examiner* — Bernarr E Gregory
*Assistant Examiner* — Juliana Cross
(74) *Attorney, Agent, or Firm* — Schwegman Lundberg & Woessner, P.A.

(57) ABSTRACT

The invention relates to a radar method for exchanging signals between at least two non-coherent transceiver units which respectively have initially non-synchronous, in particular controllable, clock sources, having the following steps: a synchronization in which clock offsets and/or clock rates of the clock sources of the at least two transceiver units are adapted; a full-duplex measuring process in which a first transmission signal of the first transceiver unit is transmitted to the second transceiver unit and a second transmission signal of the second transceiver unit is transmitted to the first transceiver unit via a radio channel; with synchronization prior to the full-duplex measuring process being carried out in such a way that a time offset and/or a frequency offset
(Continued)

between the transmission signals at least substantially remain(s) constant during a transmission time of the full-duplex measuring process.

18 Claims, 3 Drawing Sheets

(52) U.S. Cl.
CPC .......... *G01S 13/931* (2013.01); *G01S 13/933* (2020.01); *G01S 2013/9316* (2020.01)

(56) References Cited

FOREIGN PATENT DOCUMENTS

| EP | 2602636 | 6/2013 | | |
|----|---------|--------|---|---|
| EP | 2985625 | 2/2016 | | |
| EP | 2985625 A1 * | 2/2016 | ............ | G01S 13/87 |
| WO | 2003047137 | 6/2003 | | |
| WO | WO-03047137 A2 | 6/2003 | | |
| WO | WO-2017118621 | 7/2017 | | |
| WO | WO-2017118621 A1 * | 7/2017 | ........... | G01S 13/878 |
| WO | 2018206290 | 11/2018 | | |

OTHER PUBLICATIONS

International Search Report and Written Opinion issued in PCT/EP2019/073857 dated Dec. 16, 2019, 26 pages.
English Translation of CN201503494 from Patent Translate, 14 pages.
"Chinese Application Serial No. 201980071339.1, Office Action dated Nov. 7, 2023", W/English Translation, 18 pgs.

* cited by examiner

METHOD AND DEVICE FOR NON-COHERENT DISTRIBUTED FULL-DUPLEX TRANSMISSION RADAR SYSTEMS

PRIORITY DATA

This application is a bypass continuation application of International Patent Application PCT/EP2019/073857, entitled, METHOD AND DEVICE FOR NON-COHERENT DISTRIBUTED FULL-DUPLEX TRANSMISSION RADAR SYSTEMS, filed on 6 Sep. 2019, which claims priority to German patent application 102018129795.5, entitled, VERFAHREN UND VORRICHTUNG FOR NICHT-KOHÄRENTE VERTEILTE RADARSYSTEME MIT VOLLDUPLEXÜBERTRAGUNG, filed on 16 Nov. 2018. Both the PCT application and the German patent application are hereby incorporated by reference in their entirety.

FIELD OF DISCLOSURE

The invention relates to a radar method and radar system for exchanging signals between at least two non-coherent transceiver units.

BACKGROUND

In known radar methods, particularly secondary radar methods, conventionally, at least two spatially separated non-coherent transceiver units communicate with each other. FIG. 1 depicts a conventional secondary radar 4 with two transceiver units 1, 2, wherein the transceiver units 1, 2 communicate with each other. The transceiver units 1, 2 typically each have their own respective clock source 11, 21, for example a local oscillator. Further, each transceiver unit 1, 2 comprises a radio frequency (RF) generator 12, 22; a mixer or correlator 13, 23; an analog-to-digital (A/D) converter 14, 24; and an RF antenna 15, 25.

Owing to the spatial separation of the transceiver units 1, 2, direct and coherent measurement is not possible.

SUMMARY OF THE DISCLOSURE

In WO 2017/118621 A1, for example, a measuring process is described in which two transceiver units transmit and receive signals via an identical, reciprocal radio channel in such a way that the signals transmitted overlap chronologically in at least one range. In WO 2017/118621 A1, a time offset between the signals is used that is less than the signal duration (or even half the signal duration).

In each transceiver unit, the received signals are respectively mixed with the transmitted signals (down to baseband) and sampled (by means of an A/D converter), and the phase noise of both sampled signals is correlated. The influence of the phase noise may be suppressed after expensive correction steps as well as a synthetic mixing of both sampled signals. Systematic deviations may also be corrected, and as a result, a coherent measurement is ultimately made possible.

It has proven disadvantageous that in order to estimate the distance, the relative speed and the phase value, it is necessary to transmit the entire sampled signal from at least one transceiver unit to another transceiver unit.

In addition, after downconversion to baseband, the spectral efficiency is very low, due to the different clock rates (or chronological drift $\delta_t$ between the signals) between the clock sources. FIG. 2 depicts a chronological frequency response of signals that have been received and mixed into baseband by the method from WO 2017/118621 A1. Frequency Modulated Continuous Wave (FMCW) signals with a plurality of frequency ramps, also known as chirps, are used as the signals. Frequency ramps with a positive slope are known as up-chirps, and frequency ramps with a negative slope are known as down-chirps. The symbols $\delta_f$, $\mu$, $\Delta\tau$, $\tau_0$ and $T_{sw}$ are used in FIG. 2 denote the frequency offset, the sweep rate, the time offset, the propagation time in the channel and the sweep duration.

The frequency responses shown in FIG. 2 make clear that the occupied frequency band B changes with the number of the FMCW chirp. In particular, the occupied frequency band B increases with time. Moreover, there are frequency changes of each FMCW chirp, which subsequently must be corrected by expensive signal processing.

In signal processing, many expensive correction steps are necessary for digital processing (also called post-processing) of the down-mixed and sampled signals. In particular, the correction steps include a particularly expensive correction of the quadratic phase response and a shifting of the sampled signals in the time domain.

It is difficult to operate with a plurality of radar stations and efficient multiplexing, due to the drawbacks discussed above. In the case of approximately simultaneous measurement with all radar units, it would be necessary to place high demands on the A/D converters, because a high bandwidth is required in the baseband (each radar unit occupies a wide frequency band, and wide frequency intervals between the frequency bands of the radar stations are required due to the chronological change).

The object of the invention is to provide a radar method and a radar system that permits comparatively simple measurement and, in particular, makes it possible to reduce or avoid expensive correction steps in the digital processing of the transmitted signals.

The object is accomplished in particular by a radar method according to Claim 1, a radar system according to Claim 15 and/or a use of a radar method according to Claim 17.

According to a first aspect of the invention, the object is accomplished in particular by a radar method for exchanging signals between at least two non-coherent transceiver units that respectively comprise initially non-synchronous, in particular controllable, clock sources; the method has the following steps:

- a synchronization in which clock offsets and/or clock rates of the clock sources of the at least two transceiver units are aligned;
- a full-duplex measuring process in which a first transmit signal is transmitted from the first transceiver unit to the second transceiver unit and a second transmit signal is transmitted from the second transceiver unit to the first transceiver unit, over a radio channel,
- wherein the synchronization is performed prior to the full-duplex measuring process in such a way that a time offset and/or a frequency offset between the transmit signals remain(s) at least substantially constant during a transmission time of the full-duplex measuring process.

In particular, reference to a constant time offset and/or a constant frequency offset means that the time offset is less than 5 ns and/or the frequency offset is less than 5 ppm, preferably the time offset is less than 2.5 ns and/or the frequency offset is less than 2.5 ppm, or particularly preferably that the time offset is less than 1 ns and/or the frequency offset is less than 1 ppm.

The (precise) synchronization, according to the invention, of the clock sources prior to the full-duplex measuring process makes it possible to precisely measure the distance, the relative speed of the transceiver units and/or the phase position between the transmit signals of the transceiver units is made possible, and the cost of digitally processing the received signals is reduced. In this way, a plurality of expensive correction steps are eliminated. Moreover, the quantity of data required for precisely measuring the distance, the relative speed of the transceiver units and/or the phase position between the transmit signals of the transceiver units may also be reduced.

"Clock sources" preferably refers to oscillating clock sources that generate a clock signal by an oscillating process.

In the case of two clock signals, they may have a clock offset relative to each other. In addition, two clock signals may also differ in their clock rate. In the case of spatially separated transceiver units having respective clock sources, a clock offset leads to a time offset or also to a different phase position of the transmit signals of the transceiver units. Different clock rates give rise to a frequency offset between the transmit signals of the transceiver units. Changes in the clock rates, on the other hand, cause the frequencies to drift apart, namely a frequency offset that changes over time.

In the case of non-synchronous clock sources, there is/are in particular a clock offset and/or respectively different clock rates. In the present radar method, first, non-synchronous clock sources are first synchronized in one step. This means that the clock offset and/or the clock rates of the clock sources are aligned with each other. After synchronization, the clock offset and/or the clock rates is/are, in particular, aligned with each other.

A signal, such as for example a transmit signal or a received transmit signal, preferably has an amplitude, a frequency and a phase. In particular, the word duplex refers to the directionality of a transmission channel, with a full-duplex channel allowing approximately simultaneous signal transmission in both directions.

In a preferred embodiment, the synchronization is performed by radio, in particular via the radio channel, which is preferably reciprocal. This ensures that the synchronization may be carried out as simply and conveniently as possible before the full-duplex measurement process, and in particular via the same radio channel that is used during the full-duplex measuring process. Preferably, the radio channel is reciprocal, which means that the channel properties of the radio channel are the same in both directions. Alternatively and/or in addition, the synchronization may also be performed by cable. For this, only transmission of low-frequency signals is necessary, and as a result, the technical difficulty for implementation is kept simple.

Preferably, exchanged synchronization signals are used for synchronization, in particular similar synchronization signals.

A (complete) signal or synchronization signal is in particular characterized in that it contains information about phase, amplitude and frequency, or in particular the (complete) A/D converter data (i.e., the analog-to-digital converted signal). In this sense, transmitting individual parameters of the signal, such as for example a frequency, does not refer to transmitting a signal.

In a particularly preferred embodiment, the exchanged synchronization signals are modulated using a similar frequency modulation, in particular an FMCW modulation or an frequency-shift-key (FSK) modulation; and a frequency detuning and/or a frequency drift between the synchronization signals is preferably determined in the transceiver units. By using a similar frequency modulation, a frequency detuning and/or a frequency drift between the synchronization signals may be determined particularly well.

In particular, for synchronization, individual synchronization values are transmitted, particularly individual signal parameters, such as preferably frequency and/or phase values. In particular, a "synchronization value" does not denote a (complete) (synchronization) signal (comprising information regarding phase, amplitude and frequency). Rather, synchronization values are values which, for example, describe certain parameters with one or more values, such as frequency values, frequency drift values and the like.

In particular, the individual synchronization values comprise a first global time of the first transceiver unit and/or a second global time of the second transceiver unit; in particular, the first global time is determined based on the second global time and a first local time and/or the second global time is determined based on the first global time and a second local time.

As a result, a particularly good synchronization of the transceiver units is accomplished, and the synchronization may be performed in each transceiver unit in a decentralized way. Alternatively, for synchronization, a chronological drift between the clock rates of the clock sources is determined and exchanged between the at least two transceiver units.

Preferably, for synchronization, the clock sources (for example VCXOs; voltage-controlled crystal oscillators) are controlled using corresponding control signals, in particular control voltages, in such a way that the clock rates of the clock sources are aligned. This makes it possible to align the clock sources directly with each other. In addition, the clock source of the first transceiver unit may be aligned with the clock source of the second transceiver unit, and/or the clock source of the second transceiver unit may be aligned with the clock source of the first transceiver unit.

According to a preferred embodiment, in the full-duplex measuring process a distance and/or a relative speed between the at least two transceiver units is determined based on a signal propagation time of the transmit signals over the radio channel. In particular, in the full-duplex measuring process, similar transmit signals, in particular FMCW transmit signals, are exchanged, which in particular comprise a sequence of alternating up and down chirps, a sequence of only up chirps, or a sequence of only down chirps. As a result, the distance and/or the relative speed may be determined particularly precisely.

Preferably, in the full-duplex measuring process, a comparison signal is generated in each transceiver unit by mixing and/or correlating respective received transmit signals with the corresponding transmit signals, and exchanging the comparison signals between the transceiver units; in particular, the following steps are performed in at least one of the two transceiver units: Determining and correcting a center frequency; correcting a phase shift; and superimposing to form a synthetic received signal.

As a result, the number of steps in each transceiver unit may be reduced.

Preferably, in the full-duplex measuring process, a comparison signal is generated in each transceiver unit by mixing and/or correlating received transmit signals with the respective corresponding transmit signals, and determining evaluation parameters, in particular spectral evaluation parameters, in the respective transceiver unit based on the comparison signals, and the evaluation parameters are exchanged between the transceiver units. In particular, this reduces the quantity of data exchanged between the transceiver units in the full-duplex measuring process.

In a particularly preferred embodiment, a comparison spectrum of the comparison signal is generated for each signal chirp, wherein the evaluation parameters comprise a frequency value of the maximum in the comparison spectrum and a phase value of the maximum in the comparison spectrum. As a result, the quantity of data exchanged between the transceiver units in the full-duplex measuring process may be reduced to two values per chirp.

In particular, a two-dimensional comparison signal spectrum is generated in each transceiver station; the evaluation parameters comprise two frequency values per transceiver station, which are the frequency values of a maximum along each dimension of the two-dimensional comparison signal spectrum. In this way, the quantity of data exchanged between the transceiver units in the full-duplex measuring process may be further reduced to two values.

The above-mentioned object is further accomplished in particular by a radar system, preferably secondary radar system, for determining a distance and/or a relative speed, in particular for carrying out the above-mentioned method, comprising:
- at least two, preferably spatially separated, non-coherent transceiver units which respectively have initially non-synchronous, in particular controllable, clock sources;
- a synchronization device for carrying out a synchronization in which clock offsets and/or clock rates of the clock sources of the at least two transceiver units are aligned;
- with the transceiver units being designed to perform a full-duplex measuring process in which a first transmit signal is transmitted from the first transceiver unit to the second transceiver unit and a second transmit signal is transmitted from the second transceiver unit to the first transceiver unit, over a radio channel,
- wherein the synchronization device is designed to perform synchronization prior to the full-duplex measuring process, in such a way that a time offset and/or a frequency offset between the transmit signals remain(s) at least substantially constant during a transmission time of the full-duplex measuring process.

Preferably, the clock sources are in particular controllable oscillators, preferably voltage-controlled, in particular quartz oscillators (voltage-controlled crystal oscillators, VCXOs). As a result, the clock rates may be adapted (adaptively) particularly well. Alternatively, it would also be conceivable for an additional circuit, preferably a delay circuit, to modify, in particular delay, the clock signals generated by the clock sources so that the clock signals are aligned with one another.

The above-mentioned object is additionally accomplished by using the above-described radar method and/or the above-described radar system for mobile equipment, preferably for vehicles, in particular unmanned aerial vehicles or preferably passenger cars and/or trucks.

Additional embodiments are presented in the dependent claims.

BRIEF DESCRIPTION OF THE DRAWINGS

In the following description, further principles, aspects and embodiments of the invention are described, also with reference to the accompanying drawings. The drawings show the following.

DETAILED DESCRIPTION OF THE DRAWINGS

Figure 1:
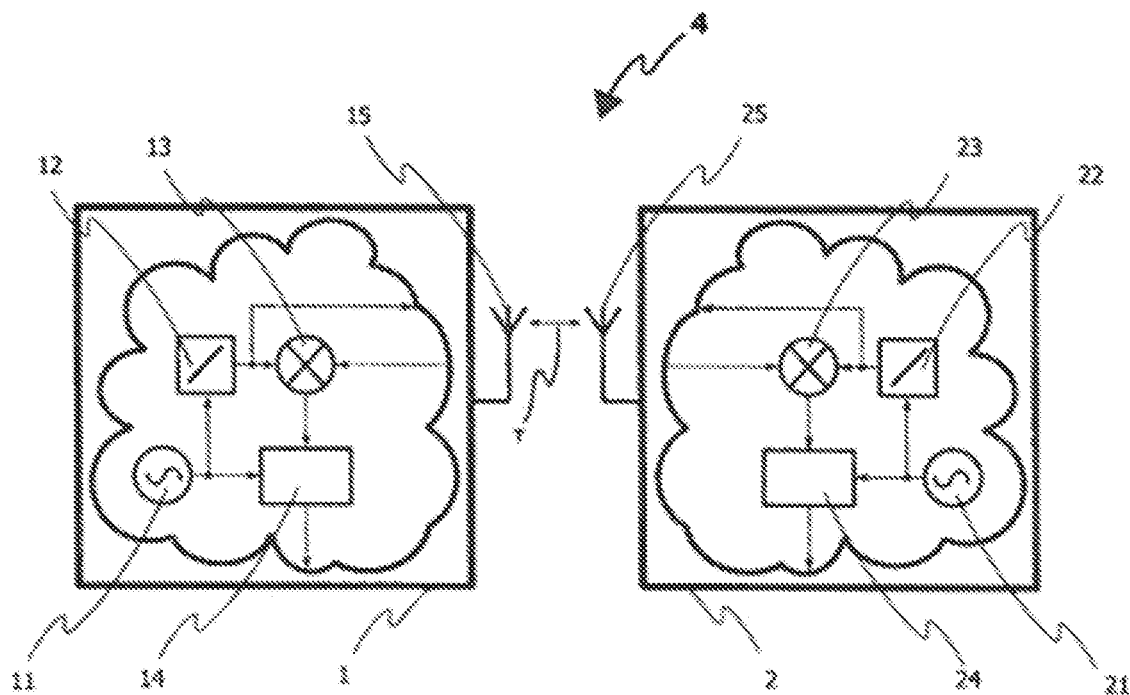
FIG. 1 two transceiver units as may be found in the prior art.
Figure 2:
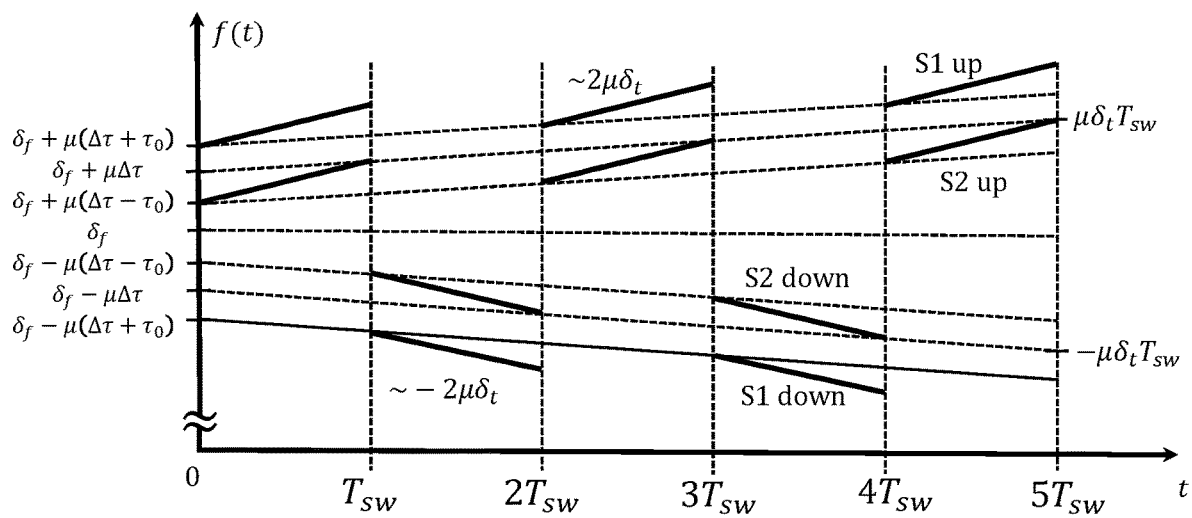
FIG. 2 Frequency responses in the baseband for non-synchronized clock sources of the transceiver units as found in the prior art.

In the following description, the same reference numerals are used for identical and equivalent parts. In the radar method according to the invention, an aligning of the clock sources, or the local oscillators, takes place prior to the actual measurement, which is the full-duplex measuring process.

For aligning the clock sources, for example, the chronological drift may first be ascertained by measurement, and subsequently the clock sources of the individual radar units are aligned.

It should further be mentioned here that the reduction of the drift could also be achieved by selecting very high-quality oscillators (for example atomic clocks). However, this is seldom possible for the use case, in view of the size, complexity, energy consumption and cost of atomic clocks.

Figure 3:
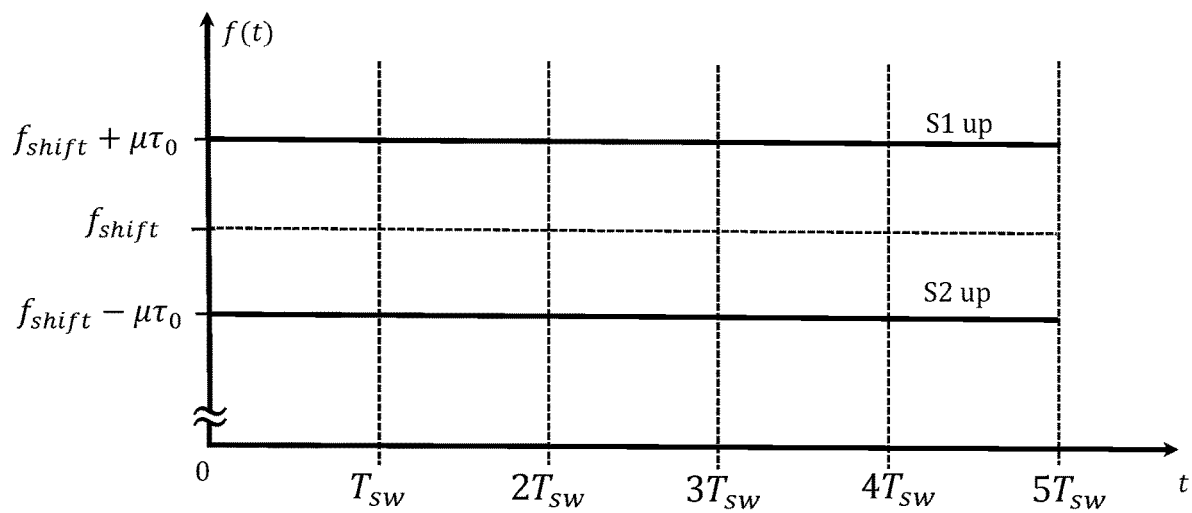
FIG. 3 Frequency responses in the baseband for synchronized clock sources of the transceiver units.

FIG. 3 shows the instantaneous frequency of the down-converted signals after synchronization (aligning of the clock sources). Here $f_{shift}=\Delta f+\mu\Delta\tau$ denotes the unknown center frequency, which consists of a frequency offset $\Delta f$ and the product of sweep rate and time offset $\rho\Delta\tau$. These two instantaneous frequencies are constant and shifted relative to one another by $2\tau_0$, namely by twice the propagation time in the transmission channel.

Derivation of the Signal Model

In the following, signals are denoted by $s_{ak,x}^{u/d}(t)$, where the superscript u/d denotes either up or down chirp, the subscripts a denote the number of the transceiver unit (radar station), $k \in \{1, \ldots, K\}$ denotes the number of the FMCW chirp, and x denotes the type of signal (transmit signal—tx, receive signal—rx, mixed signal—mix and beat signal—beat); "beat signal" refers to the digitized (discrete in time and value) mixed signal.

The phases of the transmit signals for two transceiver units, which also serve as reference signals for the mixing process, may be mathematically expressed as $$\Phi_{1k,\alpha}^{u/d}=2\pi(f_c+\Delta f/2\mp B/2)t\pm 2\pi\mu(t^2-\Delta\tau t)+\Theta_{1k}+\Psi_{1k}(t) \quad (1)$$

and $$\Phi_{2k,\alpha}^{u/d}=2\pi(f_c-\Delta f/2\mp B/2)t\pm 2\pi\mu(t^2+\Delta\tau t)+\Theta_{2k}+\Psi_{2k}(t) \quad (2)$$

where $f_c$ and B correspond to the carrier frequency and bandwidth of the RF signal. The variables $\theta_{ak}$ and $\Psi_{ak}(t)$ represent unknown start phases and phase noise during an FMCW chirp of transceiver unit a. In principle, all FMCW chirps are chronologically shifted by $\Delta\tau$ and the carrier frequency of both transceiver units differs by $\Delta f$.

The associated complex time signals may be described as $A_a \exp(j\Phi_{ak}^{u/d}(t))$. Both signals are transmitted over a transmission channel with the propagation time $\tau(t)$ relative to the respective other transceiver unit and are received there. The propagation time $\tau_k=\tau_0+\tau_k'$ in the transmission channel is composed of a start time $\tau_0$ and a small change $\tau_k'$. On this basis, distance and speed may be calculated over $x_k=c_0\tau_k=x_0+kvT_{sw}$. The latter influences the phase position from chirp to chirp, but only influences the resulting sampling frequency to a limited degree. The phase position of these received signals $$\Phi_{1k,rx}^{u/d}(t)=\Phi_{2k,tx}^{u/d}(t-\tau_k) \text{ und } \Phi_{2k,rx}^{u/d}(t)=\Phi_{1k,tx}^{u/d}(t-\tau_k) \quad (3)$$

may accordingly be represented as a time-delayed variant of the transmit signals. As is generally known, the phases of the signals after the mixing process (IQ mixing or I mixing and subsequent Hilbert transformation) and subsequent filtering with a low-pass filter may be represented as:

$$\Phi_{1k,mix}^{u/d}(t)=\Phi_{1k,tx}^{u/d}(t)-\Phi_{1k,rx}^{u/d}(t) \text{ and}$$
$$\Phi_{2k,mix}^{u/d}(t)=\Phi_{2k,rx}^{u/d}(t)-\Phi_{2k,tx}^{u/d}(t) \quad (4)$$

Substituting (1) and (2) into (4) yields the mixed signals:

$$s_{1k,mix}^{u/d}(t) = \quad (5)$$
$$A \exp\{j(2\pi(\Delta ft + (f_c \mp B/2)\tau_k \pm \mu(\tau_0 + \Delta\tau)t) + \Psi_{1k}(t) - \Psi_{2k}(t-\tau_k) + \Theta_{1k} - \Theta_{2k})\} \text{ and}$$

$$s_{2k,mix}^{u/d}(t) = \quad (6)$$
$$A \exp\{j(2\pi(\Delta ft - (f_c \mp B/2)\tau_k \pm \mu(-\tau_0 + \Delta\tau)t) + \Psi_{1k}(t-\tau_k) - \Psi_{2k}(t) + \Theta_{1k} - \Theta_{2k})\},$$

where it will be apparent that the phase position of both signals is equally influenced by the interference variables. The influence due to the propagation time or the change of the propagation time results in a complex conjugated phase change. Because it is not feasible to sample the mixed signals at the time t, the beat signals $$s_{1k,beat}^{u/d}(t) = s_{1k,mix}^{u/d}\left(t-\frac{\Delta\tau}{2}\right) = s_{1k,beat}^{u/d}(t) \exp\{j\gamma_1\} \text{ and } s_{2k,beat}^{u/d}(t) = \quad (5)$$
$$s_{2k,mix}^{u/d}\left(t+\frac{\Delta\tau}{2}\right) = s_{2k,beat}^{u/d}(t) \exp\{j\gamma_2\}$$

are a time-delayed version of the mixed signals, which for a mono-frequency signal may also be represented as a phase shift by $\gamma_1$ or $\gamma_2$.

The Full-Duplex Measuring Process

If an estimation of the distance and speed is to be performed, it is possible for example for only up-chirps to be transmitted and received. Advantageously in this case, the unambiguity range of the detectable speed is doubled. This exemplary embodiment is also possible analogously using down-chirps. After a Fourier transform $\mathcal{F}\{\cdot\}$ in the distance direction, the spectra of the sampled signals may be described as $$S_{1k,beat}^u(f) = A\delta\{f-(\Delta f+\mu(\tau_0+\Delta\tau))\}*W(f)*F\{\exp\{j\Psi_{pn,1k}(t)\}\}\cdot \quad (8)$$
$$\exp\{j\gamma_1\}\cdot\exp\{j\gamma_2\}\cdot\exp\{j(-2\pi(f_c-B/2)\tau_k+\Theta_{1k}-\Theta_{2k})\} \text{ and}$$

$$S_{2k,beat}^u(f) = A\delta\{f-(\Delta f+\mu(-\tau_0+\Delta\tau))\}*W(f)* \quad (9)$$
$$F\{\exp\{j\Psi_{pn,2k}(t)\}\}\cdot\exp\{j\gamma_2\}\cdot\exp\{j(-2\pi(f_c-B/2)\tau_k+\Theta_{1k}-\Theta_{2k})\}$$

For the window function in the spectral domain and the phase noise, the notation $W(f)$, $\Psi_{pn,1k}(t)=\Psi_{1k}(t)-\Psi_{2k}(t-\tau_k)$ and $\Psi_{pn,2k}(t)=\Psi_{1k}(t-\tau_k)-\Psi_{2k}(t)$ was chosen.

Exchanging the Transmit Signals and Superimposing the Transmit Signals:

It is now possible to exchange the sampled signals completely. The calculation in this case is simplified compared to methods of the prior art. First, based on (8) and (9), it may be determined that both sampled signals are arranged around a virtual center frequency $f_{shift}$. This is calculated via a search for the two peaks $$\hat{f}_{shift} = \quad (6)$$
$$\frac{1}{K}\sum_k\left(\arg\max_f\{S_{1k,beat}^u(f)\}+\arg\max_f\{S_{2k,beat}^u(f)\}\right) \approx \Delta f+\mu\Delta\tau.$$

In the next step, this shift is corrected, yielding $$\tilde{S}_{1k,beat}^u(f) \approx A\delta\{f-\mu\tau_0\}*W(f)*F\{\exp\{j\Psi_{pn,1k}(t)\}\}\cdot \quad (11)$$
$$\exp\{j\gamma_1\}\cdot\exp\{j(2\pi(f_c-B/2)\tau_k+\Theta_{1k}-\Theta_{2k})\} \text{ and}$$

$$\tilde{S}_{2k,beat}^u(f) \approx A\delta\{f+\mu\tau_0\}*W(f)*F\{\exp\{j\Psi_{pn,2k}(t)\}\}\cdot \quad (12)$$
$$\exp\{j\gamma_2\}\cdot\exp\{j(-2\pi(f_c-B/2)\tau_k+\Theta_{1k}-\Theta_{2k})\}$$

Such a shift may be performed, for example, with the aid of a Fourier transform. Both signals are centered around the beat frequency, which corresponds to a distance of 0 m (or a beat frequency of 0 Hz). The phases of the maximum are then obtained for each chirp and divided by two $$\phi_k = \left(\arg\{\max\{\tilde{S}_{1k,beat}^u(f)\}\}+\arg\{\max\{\tilde{S}_{2k,beat}^u(f)\}\}\right)/2 \approx \quad (7)$$
$$\Theta_{1k}-\Theta_{2k}+(\gamma_1-\gamma_2)/2+\phi_{0k}^u.$$

Due to the division, a phase jump by $\phi_{0k}^u \in l\pi$ with $l \in \mathcal{F}$ may potentially occur, which may be corrected by unwrapping (except for the phase $\varphi_0^u$ of the first chirp). The remaining phase noise during an FMCW chirp may be approximated by $\mathcal{F}\{\exp\{j\Psi_{pn,ak}(t)\}\} \approx \mathcal{F}\{1+j\varepsilon_k(t)\}$, which corresponds to a Taylor series expansion up to the linear element $\varepsilon_k(t)$. This approximation holds very well in practical applications because the level of phase noise is necessarily much less than the amplitude of the carrier signal. After correction of the phase values per FMCW chirp with (13), the signals are obtained:

$$\tilde{\tilde{S}}_{1k,beat}^u(f) \approx A\delta\{f-\mu\tau_0\}*W(f)*F\{1+j\varepsilon_k(t)\} \quad (14)$$
$$\exp\{j\phi_0^u\}\cdot\exp\{j(\gamma_1-\gamma_2)/2\}\cdot\exp\{j2\pi(f_c-B/2)\tau_k\} \text{ and}$$

$$\tilde{\tilde{S}}_{2k,beat}^u(f) \approx A\delta\{f+\mu\tau_0\}*W(f)*F\{1+j\varepsilon_k(t)\} \quad (15)$$
$$\exp\{j\phi_0^u\}\cdot\exp\{-j(\gamma_1-\gamma_2)/2\}\cdot\exp\{-j2\pi(f_c-B/2)\tau_k\},$$

the phase shift of which due to interference variables is now exactly complex conjugated. Finally, the time signal pertaining to (15) is complex conjugated and superposed to form the synthetic beat signal.

$$S_{k,synth}^u(f) \approx \quad (8)$$
$$A\delta\{f-\mu\tau_0\}*W(f)\exp\{j(\gamma_1-\gamma_2)/2\}\cdot\exp\{j2\pi(f_c-B/2)\tau_k\}\exp\{j\phi_0^u\}$$

The relative speed may be obtained computationally efficiently via a Fourier transform of (16) along the chirp number k, by means of which the relative speed may be determined.

Determining the Frequency Value and Phase Value Per Chirp:

The required quantity of data to be transmitted and the number of required computation steps may also be reduced as follows: for each FMCW chirp, the beat frequency of the maximum is respectively determined in all transceiver units.

Calculating these maxima from both transceiver units via $$\hat{\tau}_{0,k} = \left( \operatorname*{argmax}_{f} \{S^u_{1k,beat}(f)\} - \operatorname*{argmax}_{f} \{S^u_{2k,beat}(f)\} \right) \Big/ (2\mu) \quad (9)$$

leads directly to the propagation time in the transmission channel. Because the distance changes only (very) slightly during the complete transmission sequence, by averaging $$\hat{\tau}_0 = \frac{1}{K} \sum_k \hat{\tau}_{0,k} \quad (10)$$

the accuracy of a propagation time measurement (or distance measurement) may be significantly increased. Likewise, it is possible to estimate the phase change by detecting the phase of the maxima in both radars via $$\hat{\phi}_k = \arg\{\max\{S^u_{1k,beat}\{\}\}\}\arg\{\max\{S^u_{2k,beat}\{\}\}\}\pi\left(f_c - \frac{B}{2}\right)_{k_0}\} \quad (11)$$

Via this phase change, the change in the length of the transmission path may be obtained with great precision and speeds may be measured. The variable $\phi_0$ represents an unknown start phase that has no influence on the measurement. Thus, the transmission of 2K real values is necessary for a chirp sequence with KFMCW chirps.

Determining a Two-Dimensional Spectrum Per Transceiver Unit:

In this exemplary embodiment, distance and relative speed may be estimated with the transmission of 2 real values per transceiver unit (independent of the length of the chirp sequence). For this, it is assumed that systematic interferences are dominant (phase noise has comparatively little influence). Thus, the clock frequencies of the two transceiver units do not match exactly and thus the chronological drift has not been set exactly to zero. This results in a linear phase change for each FMCW chirp, which may be expressed by a frequency offset $\Delta f_2$ along the speed axis, and occurs equally in both transceiver units.

Thus, the two 2D Fourier transforms $\mathcal{F}_2\{\cdot\}$ along the FMCW chirps may be described as $$S^u_{k1,2D}(f, f_2) \approx A\delta\{f - (\Delta f + \mu(\tau_0 + \Delta\tau))\} * W(f) * F_2\{F\{1 + j\varepsilon_k(t)\}\} * \quad (20)$$
$$\delta\{f_2 - (f_c - B/2)\tau_k - \Delta f_2\} * W_2(f_2) \cdot \exp\{j\gamma_1\} \text{ and}$$

$$S^u_{k2,2D}(f, f_2) \approx A\delta\{f - (\Delta f + \mu(-\tau_0 + \Delta\tau))\} * W(f) * \quad (21)$$
$$F_2\{F\{1 + j\varepsilon_k(t)\}\} * \delta\{f_2 + (f_c - B/2)\tau_k - \Delta f_2\} * W_2(f_2) \cdot \exp\{j\gamma_2\}$$

where $\gamma_1'$ and $\gamma_2'$ represent unknown and irrelevant phase values. The interference due to the 2D Fourier transform of the phase noise $\mathcal{F}_2\{\mathcal{F}\{1+j\varepsilon_k(t)\}\}$ is quasi-identical at both stations and cancels out. Calculating the maxima along the distance and speed axes (propagation time and change in propagation time) from the first transceiver unit and the second transceiver unit now directly yields the desired measurement values:

$$\hat{\tau}_0 = \left( \operatorname*{argmax}_{f} \{S^u_{1k,2D}(f, f_2)\} - \operatorname*{argmax}_{f} \{S^u_{2k,2D}(f, f_2)\} \right) \Big/ (2\mu) \text{ and} \quad (22)$$

$$\hat{\tau}_k = \left( \operatorname*{argmax}_{f_2} \{S^u_{1k,2D}(f, f_2)\} - \operatorname*{argmax}_{f_2} \{S^u_{2k,2D}(f, f_2)\} \right) \Big/ (2(f_c - B/2)). \quad (23)$$

LIST OF REFERENCE SIGNS

1 First transceiver unit
2 Second transceiver unit
4 Radar system
11 Clock source of the first transceiver unit
12 Radio frequency (RF) generator of the first transceiver unit
13 Mixer of the first transceiver unit
14 Analog-to-digital (A/D) converter of the first transceiver unit
15 RF antenna of the first transceiver unit
21 Clock source of the second transceiver unit
22 Radio frequency (RF) generator of the second transceiver unit
23 Mixer of the second transceiver unit
24 Analog-to-digital (A/D) converter of the second transceiver unit
25 RF antenna of the second transceiver unit
T Radio channel

What is claimed is:

1. A radar method for exchanging signals between at least two non-coherent transceiver units, the method comprising:
   aligning clock offsets and/or clock rates of respective clock sources of the at least two transceiver units;
   performing a full-duplex measuring process, in which a first transmit signal is transmitted from a first transceiver unit to a second transceiver unit and a second transmit signal is transmitted from the second transceiver unit to the first transceiver unit, the measuring process comprising generating a comparison signal in each of the first transceiver unit and the second transceiver unit by mixing and/or correlating the first transmit signal with a received second transmit signal and vice versa, respectively; and
   exchanging the comparison signals between the transceiver units as part of the full-duplex measuring process:
   wherein the alignment of clock offsets and/or clock rates is performed prior to the full-duplex measuring process, such that a time offset and/or a frequency offset between the transmit signals remains at least substantially constant during a transmission time of the full-duplex measuring process.

2. The method according to claim 1, wherein the aligning is performed by radio or by cable.

3. The method according to claim 1, wherein exchanged synchronization signals are used for the aligning.

4. The method according to claim 3, wherein the exchanged synchronization signals are modulated using frequency modulation, including an FMCW modulation or an FSK modulation.

5. The method according to claim 1, wherein for the aligning, individual synchronization values, in particular individual signal parameters such as preferably frequency and/or phase values are transmitted.

6. The method according to claim 5, wherein the individual synchronization values comprise a first global time of the first transceiver unit and/or a second global time of the second transceiver unit, wherein the first global time is determined based on the second global time and a first local time, and/or the second global time is determined based on the first global time and a second local time.

7. The method according to claim 1, wherein, for the aligning, a chronological drift between the clock rates of the clock sources is determined and exchanged, between the at least two transceiver units.

8. The method according to claim 1, wherein for the aligning the clock sources are controlled using corresponding control signals such that the clock rates of the clock sources are aligned.

9. The method according to claim 1, wherein in the full-duplex measuring process, a distance and/or a relative speed between the at least two transceiver units are determined based on a signal propagation time of the transmit signals.

10. The method according to claim 1, wherein in the full-duplex measuring process, transmit signals are exchanged, which comprise a sequence of alternating up and down chirps, a sequence of only up chirps, or a sequence of only down chirps.

11. The method according to claim 1, wherein, the full-duplex measuring process comprises, in at least one of the two transceiver units:
    determining and correcting a center frequency; and
    correcting a phase shift.

12. The method according to claim 1, wherein, in the full-duplex measuring process, evaluation parameters are determined based on comparison signals.

13. The method according to claim 12, wherein for each signal chirp, a comparison spectrum of the comparison signal is generated, and the evaluation parameters comprise a frequency value corresponding to a maximum magnitude in the comparison spectrum and a phase value corresponding to the maximum magnitude in the comparison spectrum.

14. The method according to claim 12, wherein a two-dimensional comparison signal spectrum is generated in each transceiver station, and the evaluation parameters comprise two frequency values per transceiver station, which are the frequency values of a maximum magnitude along each dimension of the two-dimensional comparison signal spectrum.

15. A radar system for determining a distance and/or a relative speed, the system comprising:
    at least two non-coherent transceiver units, that respectively have non-synchronous clock sources;
    a synchronization device for aligning clock offsets and/or clock rates of the clock sources of the at least two transceiver units;
    wherein the transceiver units are configured to perform a full-duplex measuring process, in which a first transmit signal of a first transceiver unit is transmitted to a second transceiver unit and a second transmit signal of the second transceiver unit is transmitted to the first transceiver unit;
    wherein the synchronization device is configured to perform the alignment of clock offsets and/or clock rates prior to the full-duplex measuring process, such that a time offset and/or a frequency offset between the transmit signals remains at least substantially constant during a transmission time of the full-duplex measuring process;
    wherein the first transceiver unit is configured to generate a comparison signal by mixing and/or correlating the first transmit signal with a received second transmit signal and the second transceiver unit is configured to generate another comparison signal by mixing and/or correlating the second transmit signal with a received first transmit signal, and
    wherein the transceiver units are further configured to exchange the comparison signals as part of the full-duplex measuring process.

16. The radar system according to claim 15, wherein the clock sources are controllable oscillators.

17. The method according to claim 1, wherein the method is performed by a mobile apparatus, comprising a vehicle.

18. The system according to claim 15, wherein at least one of the transceiver units is associated with a vehicle.

* * * * *

UNITED STATES PATENT AND TRADEMARK OFFICE
CERTIFICATE OF CORRECTION

| | |
|---|---|
| PATENT NO. | : 11,994,608 B2 |
| APPLICATION NO. | : 17/330094 |
| DATED | : May 28, 2024 |
| INVENTOR(S) | : Gottinger et al. |

It is certified that error appears in the above-identified patent and that said Letters Patent is hereby corrected as shown below:

In the Claims

In Column 10-11, Line 67 and 1-2, in Claim 5, delete "values, in particular individual signal parameters such as preferably frequency and/or phase values" and insert --values-- therefor In Column 11, Line 12, in Claim 7, delete "exchanged," and insert --exchanged-- therefor In Column 12, Line 33, in Claim 15, delete "signal," and insert --signal;-- therefor Signed and Sealed this
Sixth Day of August, 2024

Katherine Kelly Vidal
*Director of the United States Patent and Trademark Office*